(12) United States Patent
de Molina et al.

(10) Patent No.: US 6,220,406 B1
(45) Date of Patent: Apr. 24, 2001

(54) PASSIVE ANTI-ROLL SYSTEM

(75) Inventors: Simon Anne de Molina, Merchtem; Stefan Deferme, Heusden-Zolder, both of (BE)

(73) Assignee: Tenneco Automotive Inc., Lake Forest, IL (US)

( * ) Notice: Subject to any disclaimer, the term of this patent is extended or adjusted under 35 U.S.C. 154(b) by 0 days.

(21) Appl. No.: 09/572,359

(22) Filed: May 17, 2000

Related U.S. Application Data

(62) Division of application No. 09/074,728, filed on May 7, 1998, now Pat. No. 6,102,170.

(51) Int. Cl.[7] ............................. F16F 9/34; F16F 9/504; B60G 17/08

(52) U.S. Cl. ................... 188/275; 188/322.13; 267/221; 267/226

(58) Field of Search ................... 188/275, 282.5, 188/322.13, 282.6, 318, 181 A, 266.2; 280/5.506, 5.502, 5.513, 5.507–5.512, 124.106; 137/38; 185/284; 267/266, 221

(56) References Cited

U.S. PATENT DOCUMENTS

| | | |
|---|---|---|
| 1,281,079 | 10/1918 | Sears . |
| 1,857,750 | 5/1932 | Wilbur . |
| 2,606,630 | 8/1952 | Rossman . |
| 2,774,448 | 12/1956 | Hultin . |
| 2,877,872 | * 3/1959 | Krizan ................... 188/275 |
| 2,957,703 | 10/1960 | Ross . |
| 3,414,092 | 12/1968 | Speckhart . |
| 3,706,362 | 12/1972 | Faure . |
| 3,862,751 | 1/1975 | Schwaller . |
| 3,895,816 | 7/1975 | Takahashi et al. . |
| 3,945,626 | 3/1976 | Tilkens . |
| 3,966,030 | 6/1976 | Sirven . |
| 4,004,662 | 1/1977 | Sorgatz et al. . |
| 4,126,302 | 11/1978 | Curnutt . |
| 4,148,469 | 4/1979 | Geyer . |
| 4,153,237 | 5/1979 | Supalla . |
| 4,162,062 | 7/1979 | Strauss . |
| 4,210,344 | 7/1980 | Curnutt . |
| 4,226,408 | 10/1980 | Tomita et al. . |
| 4,254,849 | 3/1981 | Pohlenz . |
| 4,274,515 | 6/1981 | Bourcier de Carbon . |
| 4,328,960 | 5/1982 | Handke et al. . |

(List continued on next page.)

FOREIGN PATENT DOCUMENTS

| | | |
|---|---|---|
| 1 209 007 | 1/1966 | (DE) . |
| 0 744 307 A1 | 11/1996 | (EP) . |
| 2 252 508 | 11/1973 | (FR) . |
| 54-44167 | 4/1979 | (JP) . |
| 4-296234 | 10/1992 | (JP) . |

*Primary Examiner*—Douglas C. Butler
(74) *Attorney, Agent, or Firm*—Harness, Dickey & Pierce, PLC

(57) ABSTRACT

A passive damping for a shock absorber is disclosed. The shock absorber includes a working chamber, and a piston disposed in the working chamber. The piston includes a primary bypass valve for defining an upper fluid portion and a lower fluid portion. A piston rod is connected to the piston and extends through the top portion of the working chamber. A variable bypass assembly is disposed between a first fluid chamber and a second fluid chamber. The variable bypass assembly includes at least one bypass aperture for providing communication of damping fluid between the first and second fluid chambers. The variable bypass assembly also includes a passive control member for varying the size of the bypass aperture, and biasing structure for normally retaining the passive control member in a position which maximizes the size of the bypass aperture. The passive control member is such that an accelerating force placed upon the shock absorber causes motion of the passive control member for restricting the size of the bypass aperture and increasing a damping force provided by the shock absorber.

7 Claims, 4 Drawing Sheets

U.S. PATENT DOCUMENTS

| | | |
|---|---|---|
| 4,527,674 | 7/1985 | Mourray . |
| 4,546,959 | 10/1985 | Tanno . |
| 4,660,686 | 4/1987 | Munning et al. . |
| 4,673,067 | 6/1987 | Munning et al. . |
| 4,762,308 | 8/1988 | Geno . |
| 4,768,629 | 9/1988 | Wossner . |
| 4,786,034 | 11/1988 | Heess et al. . |
| 4,834,088 | 5/1989 | Jeanson . |
| 4,838,393 | 6/1989 | Mourray et al. . |
| 4,907,680 | 3/1990 | Wolfe et al. . |
| 4,917,222 | 4/1990 | Bacardit . |
| 4,997,068 | 3/1991 | Ashiba . |
| 5,024,301 | 6/1991 | Cook . |
| 5,043,649 | 8/1991 | Murakami et al. . |
| 5,080,205 | 1/1992 | Miller et al. . |
| 5,095,581 | 3/1992 | Sarto . |
| 5,146,948 | 9/1992 | Runkel . |
| 5,154,442 | 10/1992 | Milliken . |
| 5,201,388 | 4/1993 | Malm . |
| 5,201,389 | 4/1993 | Miller et al. . |
| 5,213,183 | 5/1993 | Maurer . |
| 5,269,557 | 12/1993 | Butsuen et al. . |
| 5,269,558 | 12/1993 | Yoshioka et al. . |
| 5,307,907 | 5/1994 | Nakamura et al. . |
| 5,332,068 | 7/1994 | Richardson et al. . |
| 5,360,230 | 11/1994 | Yamada et al. . |
| 5,437,354 | 8/1995 | Smith . |
| 5,462,140 | 10/1995 | Cazort et al. . |
| 5,598,903 | 2/1997 | Richardson . |
| 5,823,305 | 10/1998 | Richardson et al. . |
| 6,102,170 * | 8/2000 | de Molina et al. .................. 188/275 |

* cited by examiner

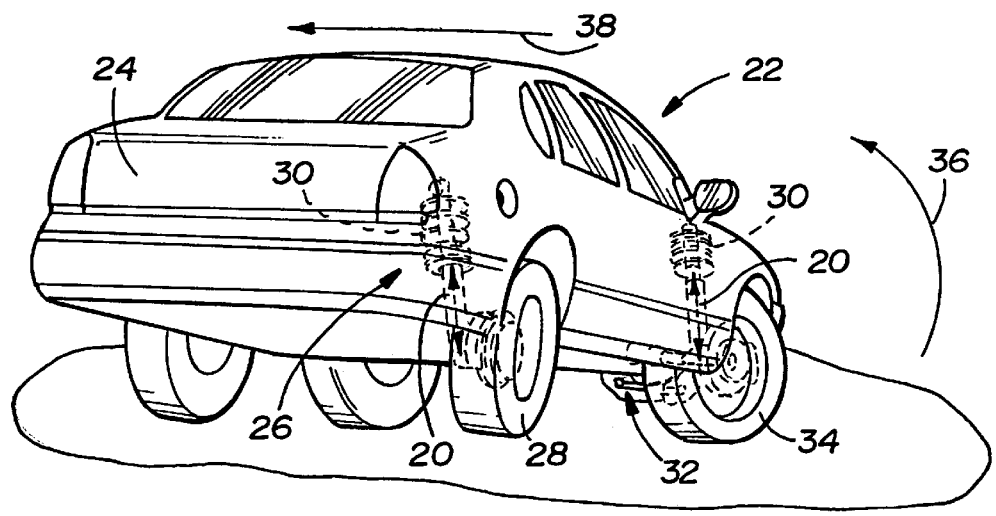
Fig-1
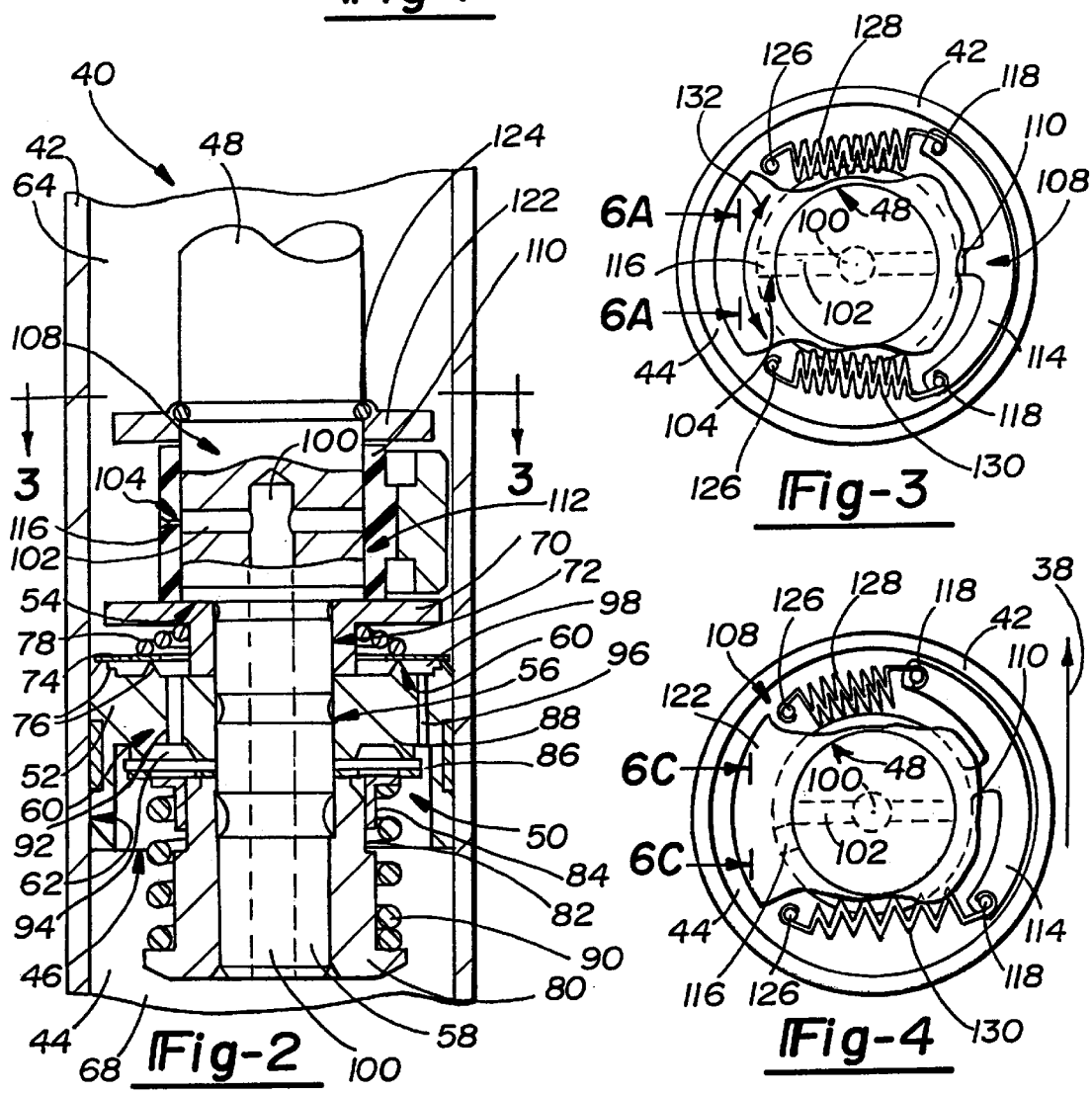
Fig-2
Fig-3
Fig-4

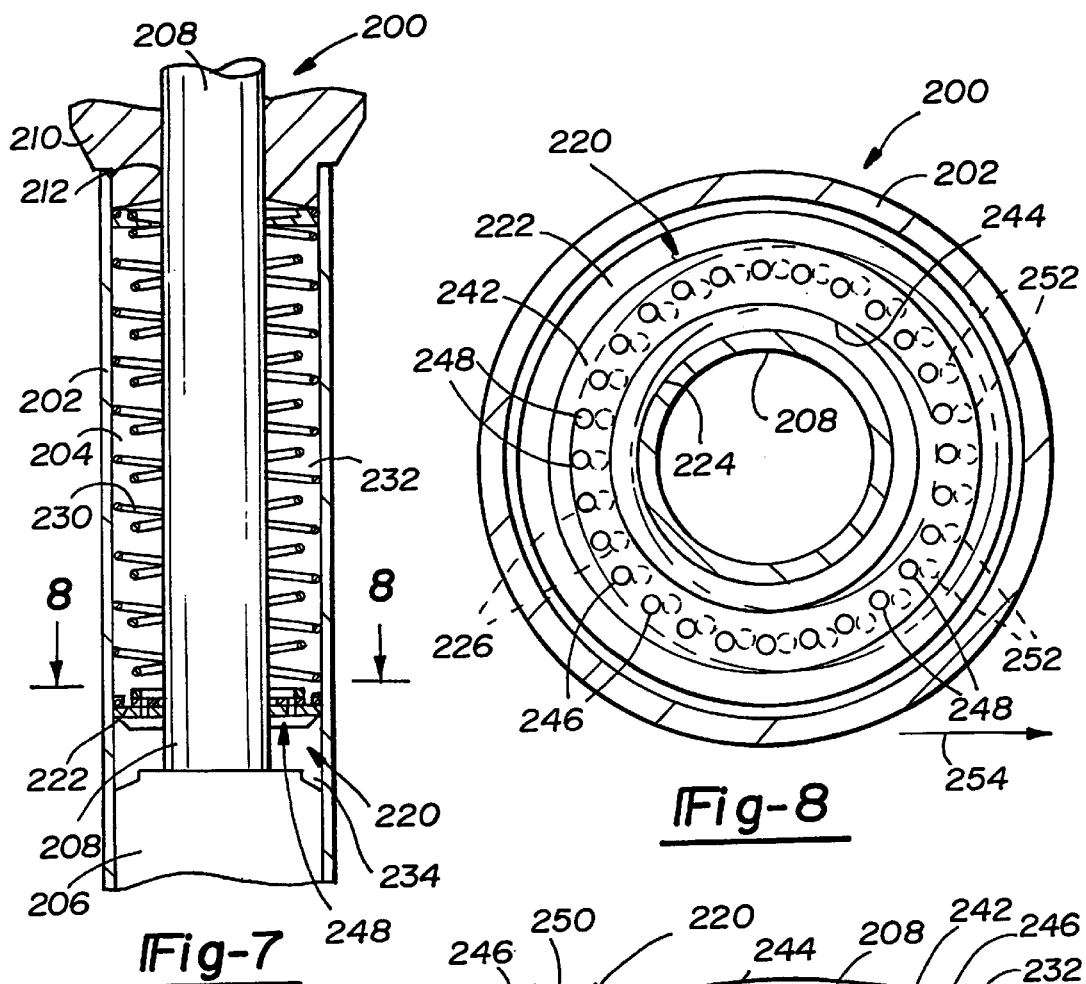
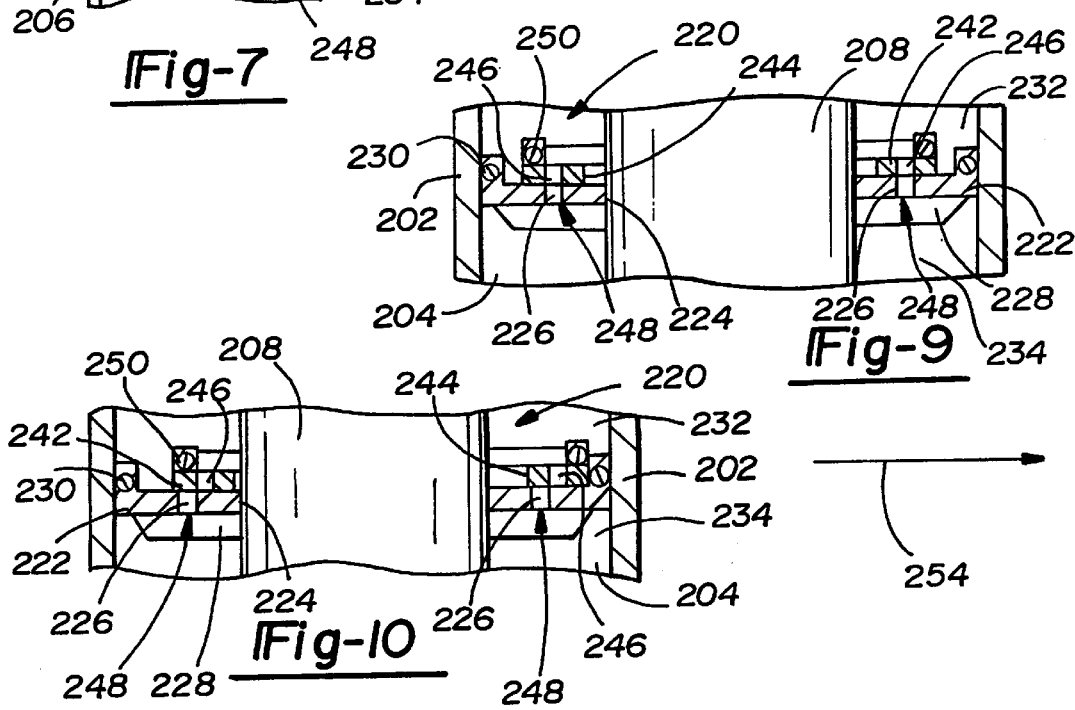

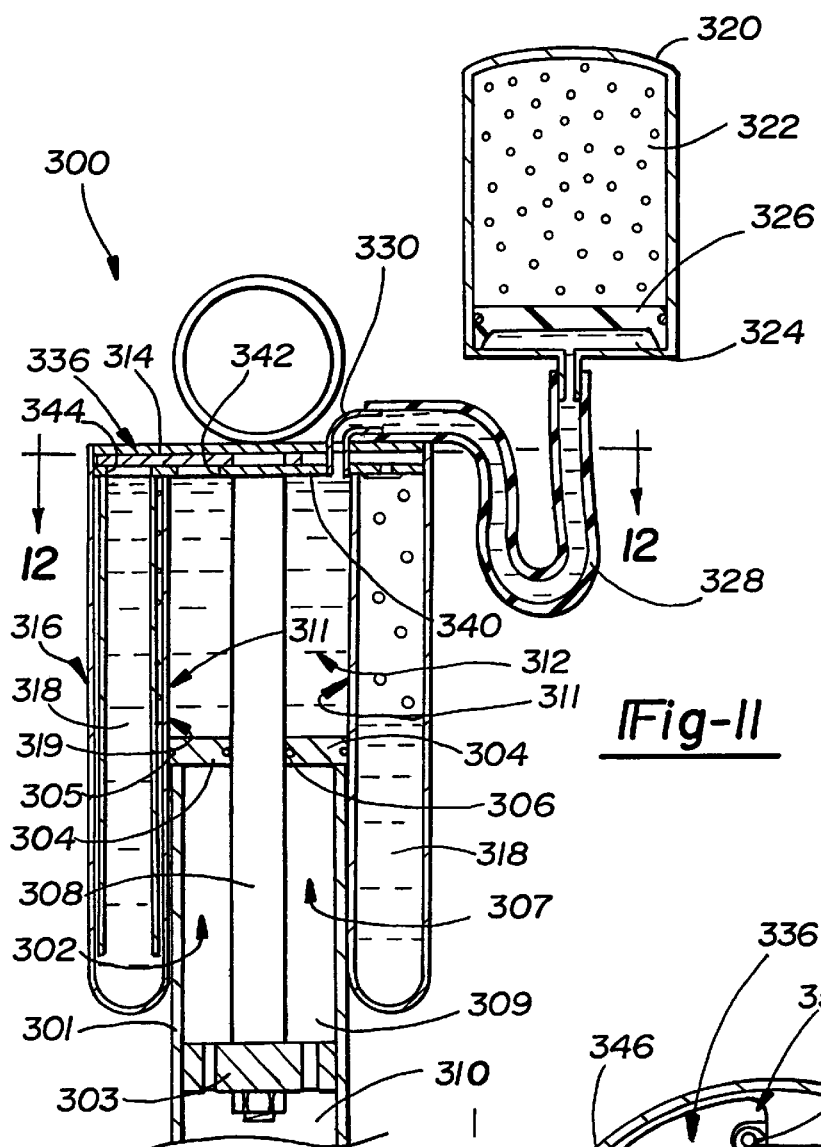
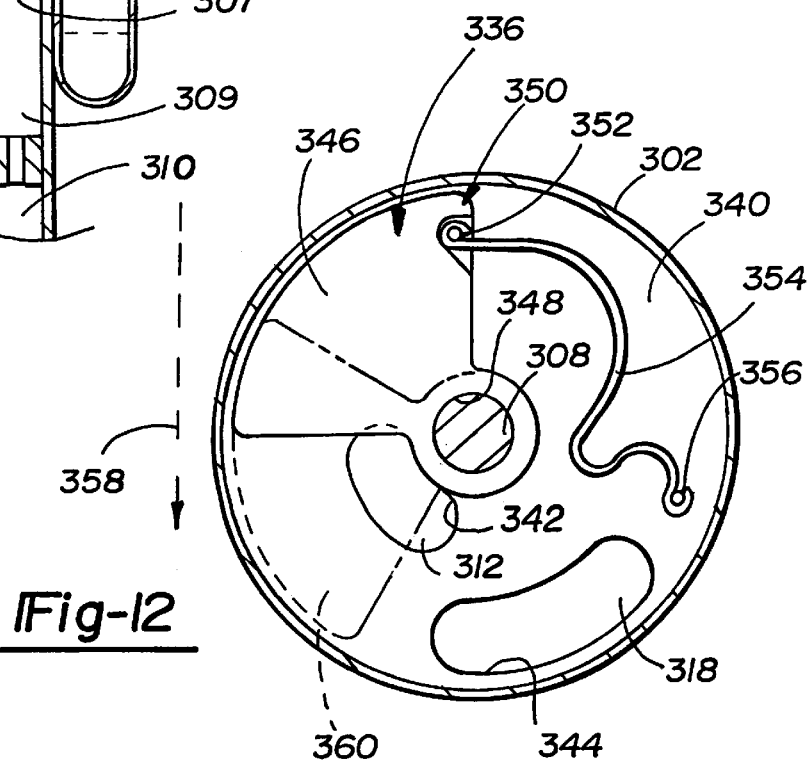

PASSIVE ANTI-ROLL SYSTEM

This is a division of U.S. patent application Ser. No. 09/074,728, filed May 7, 1998, now U.S. Pat. No. 6,102,170.

BACKGROUND OF THE INVENTION

1. Field of the Invention

The present invention relates generally to shock absorbers which create an anti-roll system for a vehicle. More particularly, the present invention relates to shock absorbers having a passive damping system for providing variable damping in response to lateral forces placed upon the vehicle.

2. Description of the Related Art

Various types of shock absorbers are used in connection with motor vehicle suspension systems to absorb unwanted vibrations which occur during various driving conditions. To dampen the unwanted vibrations, shock absorbers are generally connected between the sprung portion (i.e., the vehicle body) and the unsprung (i.e., the suspension) of the vehicle. A piston assembly is located within the working chamber of the shock absorber and is connected to the body of the motor vehicle through a piston rod. Generally, the piston assembly includes a primary valving arrangement that is able to limit the flow of damping fluid within the working chamber when the shock absorber is compressed or extended. As such, the shock absorber is able to generate a damping force which "smooths" or "dampens" the vibrations transmitted from the suspension to the vehicle body. Typically, these vibrations occur from forces generated in a vertical direction between the vehicle body and the driving surface.

The greater the degree to which the flow of damping fluid within the working chamber is restricted across the piston assembly, the greater the damping forces which are generated by the shock absorber. It is also possible to implement a primary valving arrangement which produces one magnitude of damping on the compression stroke, and a second magnitude of damping on the rebound stroke. However, these different damping rates are typically constant because they are produced by varying the sizes of the compression and rebound bypass orifices.

While these shock absorbers produce ride comfort levels ranging from "soft" to "firm," few, if any, of the known shock absorbers produce varying degrees of damping in a passive manner. The shock absorber systems known within the art which are capable of producing varying degrees of damping force, typically achieve this through the use of active control systems. However, these systems generally react to the vertically generated forces placed upon the vehicle suspension.

Accordingly, it is desirable to provide a shock absorber which includes a primary damping mechanism for counteracting the vertical forces placed upon the vehicle, and a secondary damping mechanism which is capable of providing varying damping in response to horizontal and lateral forces which are placed upon the vehicle suspension. Further, it is desirable that this secondary and variable damping be provided in proportion to the lateral force encountered by a passive control or valving arrangement. Such a system could be used to implement a passive anti-roll system for enhancing the control to the vehicle provided by the vehicle suspension. Such a passive damping system also eliminates the need for complicated and expensive control systems which actively provide the varying degrees of damping.

An example of the lateral forces placed upon the vehicle suspension are the lateral forces generated during high-speed cornering. As these lateral forces are counteracted by the vehicle's suspension and tires, a rolling action on the vehicle body is produced. When these rolling forces exceed the limit for the vehicle, a rollover condition may be created where the vehicle is literally flipped over on its side. Accordingly, it is desirable to provide a shock absorber which provides increased damping in response to these lateral and horizontal forces for counteracting or at least minimizing these rolling forces.

SUMMARY OF THE INVENTION

Accordingly, it is a primary object of the present invention to provide a passive damping system for a shock absorber which can be used to implement a passive anti-roll system for a vehicle. The shock absorber includes a working chamber, and a piston disposed in the working chamber. The piston includes a primary bypass valve for defining an upper fluid portion and a lower fluid portion. A piston rod is connected to the piston and extends through the top portion of the working chamber. A variable bypass assembly is disposed between a first fluid chamber and a second fluid chamber, and includes at least one bypass aperture for providing communication of damping fluid between the first and second fluid chambers. The variable bypass assembly also includes a passive control member for varying the size of the bypass aperture, and biasing means for normally retaining the passive control member in a position which maximizes the size of the bypass aperture. The passive control member is such that an accelerating force placed upon the shock absorber causes motion of the passive control member for restricting the size of the bypass aperture and increasing a damping force provided by the shock absorber.

Various other objects, features and advantages of the present invention will become apparent from the following detailed description taken in conjunction with the accompanying drawings and the appended claims.

BRIEF DESCRIPTION OF THE DRAWINGS

FIG. 1 is a schematic representation of the shock absorbers, implementing a passive anti-roll system according to the present invention, in operative association with a typical automobile experiencing the lateral forces associated with a rolling condition produced by cornering;

FIG. 2 is a cross-sectional view of the piston assembly and the passive damping system associated with one preferred embodiment of the present invention;

FIG. 3 is a cross-sectional view taken along line 3—3 of FIG. 2 showing the passive damping mechanism according to one preferred embodiment of the present invention;

FIG. 4 is also a cross-sectional view similar to that in FIG. 3 showing the passive damping mechanism in the closed position due to the forces of a lateral acceleration;

FIG. 7 is a cross-sectional view of a portion of the piston assembly and passive damping mechanism associated with a second preferred embodiment of the present invention;

FIG. 8 is a cross-sectional view taken along line 8—8 of FIG. 7 showing the passive damping system associated with the second preferred embodiment of the present invention;

FIG. 9 is an enlarged cross-sectional view of the passive damping system shown in the open position in accordance with the second preferred embodiment of the present invention;

FIG. 10 is an enlarged cross-sectional view of the passive damping system shown in the partially restricted position due to a horizontal accelerating force;

FIG. 11 is a cross-sectional view of a shock absorber having a passive damping system associated with a third preferred embodiment of the present invention; and FIG. 12 is a cross-sectional view taken along line 12—12 of FIG. 11 showing the passive damping system associated with the third embodiment of the present invention.

DETAILED DESCRIPTION OF THE PREFERRED EMBODIMENTS

Figure 5:
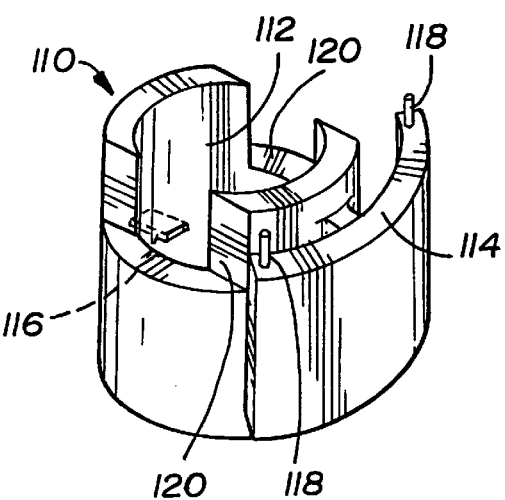
FIG. 5 is a perspective view of the passive damping element according to one preferred embodiment of the present invention.

Referring to FIG. 1, a plurality of four shock absorbers 20 according to a preferred embodiment of the present invention are shown. The shock absorbers 20 are depicted in operative association with a diagrammatic representation of a conventional automobile 22 having a vehicle body 24. The automobile 22 includes a rear suspension system 26 having a transversely extending rear axle assembly (not shown) adapted to operatively support the vehicle's rear wheels 28. The rear axle assembly is operatively connected to the vehicle body 24 by a pair of shock absorbers 20 and a pair of helical coil springs 30 (only one shown). Similarly, the automobile 22 has a front suspension system 32 including a pair of front axle assemblies (one side shown) to operatively support the vehicle's front wheels 34. The front axle assembly is operatively connected to the vehicle body 24 by means of a second pair of shock absorbers 20 and by another pair of helical coil springs 30 (right side shown). The shock absorbers 20 serve to damp the relative movement of the unsprung portion (i.e., the front and rear suspension systems 32, 26 and the sprung portion (i.e., the vehicle body 24) of the automobile 22.

The automobile 22 is illustrated executing a right hand cornering maneuver, which produces various lateral forces upon the vehicle body 24, and causes the vehicle body 24 to "roll" with respect to the vehicle suspension 32, 26. Arrow 36 depicts the rolling force placed on the vehicle body 24 during the cornering maneuver, and arrow 38 depicts the lateral force placed on the vehicle body 24 during the cornering maneuver. While the automobile 22 has been depicted as a passenger car, the shock absorber 20 associated with the present invention for implementing a passive anti-roll system may be used with other types of vehicles or in other types of damping applications. Further, the term "shock absorber" as used herein will refer to shock absorbers in the general sense of the phrase, and will further include MacPherson style struts.

Turning now to FIGS. 2 through 6C, the passive damping system according to one preferred embodiment of the present invention is described with more detail. With particular reference to FIG. 2, a direct acting hydraulic actuator or shock absorber 40 having a passively controlled damping system is shown to include an elongated tubular pressure cylinder 42 provided for defining a hydraulic fluid containing working chamber 44. Disposed within working chamber 44 is a reciprocable piston assembly 46 that is secured to one end of an axially extending piston rod 48. Piston rod 48 is supported and guided for movement within pressure cylinder 42 by means of a combination seal and rod guide assembly (not shown) located in an upper end of pressure cylinder 42 and having a central axially extending bore (not shown) through which piston rod 48 is reciprocally moveable. As will be appreciated by those skilled in the art, upon reciprocable movement of piston rod 48 and piston assembly 46, hydraulic fluid within working chamber 44 will be transferred between an upper portion 64 and a lower portion 66 of working chamber 44 for damping the relative movement between the vehicle body 24 and the suspension 32, 26, of the motor vehicle 22.

Piston assembly 46 is shown to include a conventional pressure operated valving arrangement 50 that is operable for selectively controlling the bi-directional flow of hydraulic damping fluid through a primary flow path between upper and lower portions 64 and 66, respectively, of working chamber 44 during reciprocable movement of piston assembly 46. In general, pressure operated valving arrangement 50 is well suited for use in a heavy duty shock absorber for damping the relatively high forces generated during the rebound stroke so as to maintain optimum road holding ability and vehicle handling requirements. In addition, pressure operated valving arrangement 50 is constructed to provide common primary and secondary flow paths for regulating the flow of hydraulic damping fluid during both the compression and rebound strokes of shock absorber 40. Moreover, pressure operated valving arrangement 50 is constructed to provide distinct flow restrictions and, in turn, damping characteristics for the compression and rebound strokes. One skilled in the art will appreciate that several different types of valving arrangements 50 can be used in conjunction with the passive damping system 108 of the present invention.

Piston assembly 46 includes a generally cylindrical shaped piston body 52 formed with a central axially extending bore 56 within which a reduced diameter end portion 58 of piston rod 48 is received. The piston body 52 is further defined by cylindrical side wall portions 62, and a valve body portion 60. An upper annular support sleeve 70 having an axially extending bore 72 formed therein also receives an upper portion of reduced diameter end portion 58 of piston rod 48. The upper portion of support sleeve 70 engages a shoulder 54 formed on piston rod 48. The lower portion of support sleeve 70 engages a top portion of piston body 52. An annular valve disk 74 is fitted around support sleeve 70 and engages an annular valve seat 76 formed on the top portion of piston body 52. A biasing spring 78, also supported around support sleeve 70 biases valve disk 74 against annular valve seat 76.

A lower retaining sleeve 80 is also secured at the lower end of reduced diameter end portion 58 of piston rod 48. Lower retaining sleeve 80 is provided with an annular recess 82 for receiving a pressure sleeve 84, which is capable of axial movement along the surface defined by annular recess 82. A valve disk pack 86 is supported by the top portion of pressure sleeve 84, and further engages an annular valve seat 88 formed on the lower portion of piston body 52. A biasing spring 90 maintains the requisite biasing force against pressure sleeve 84 so that the flow of hydraulic fluid can be properly controlled via valve disk pack 86 and annular valve seat 88 for defining the desired damping characteristics.

The piston body 52 includes a plurality of first bores 92 formed around an inner portion of piston body 52 for creating a first series flow passages 94. Piston body 52 also includes a plurality of second bores 96 formed around an outer portion of piston body 52 for creating a second series flow passages 98. Both first flow passages 94 and second flow passages 98 allow hydraulic fluid to communicate between the upper and lower chambers 64 and 66 of working chamber 44.

The piston rod 48 further includes an axial bypass bore 100 formed in the center thereof, and a transverse bypass bore 102 intersecting the top portion of axial bypass bore 100, which together create a secondary bi-directional flow passage 104 between the upper and lower chambers 64 and 66 of working chamber 44. The fluid communication through bi-directional flow passage 104 is regulated by an eccentrically weighted control sleeve 110. Control sleeve 110 includes a central bore 112 which allows the control sleeve 110 to rotate about piston rod 48. Control sleeve 110 is supported by support sleeve 70, and is further maintained in its proper operating position by a fixed control collar 122 and retainer 124.

Figure 6:
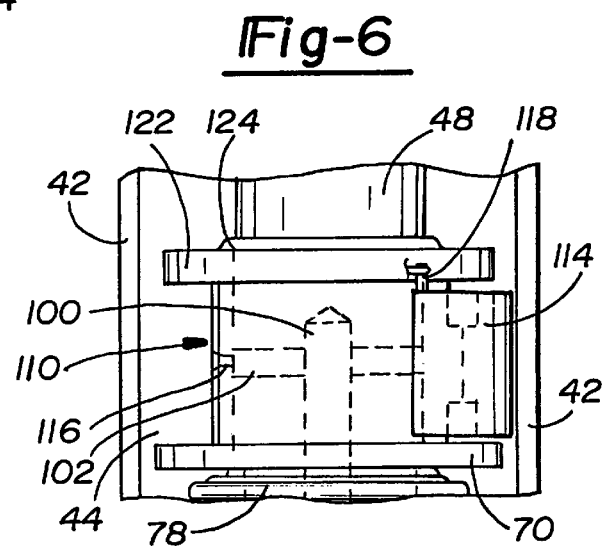
FIG. 6 is a side elevational view of the eccentrically weighted passive damping element according to one preferred embodiment of the present invention.

As best viewed in FIGS. 5 and 6, the components and features of the passive damping system 108 associated with the passive anti-roll system of the present invention are described in more detail. Specifically, control sleeve 110 includes an eccentric mass 114 formed along one side. Mass 114 serves to shift the moment of inertia of the control sleeve 110 outboard from the central axis of the control sleeve 110. Control sleeve 110 also includes a split or slot 116 which is normally aligned with the transverse bypass bore 102 formed in piston rod 48 to allow for fluid communication therethrough. A pair of spring retaining posts 118 are formed in the top portion of eccentric mass 114 at opposite ends thereof. A similar pair of spring retaining posts 126 are also formed within annular control collar 122 (FIGS. 3 and 4). Control sleeve 110 has a pair of spring recesses 120 formed on opposing sides so that biasing springs 128 and 130 can be extended between the pair of retaining posts 118 formed on eccentric mass 114 and the pair of retaining posts 126 formed on the control collar 122. The pair of spring recesses 120 also allow the control sleeve 110 to rotate more freely about piston rod 48.

Figure 6A:
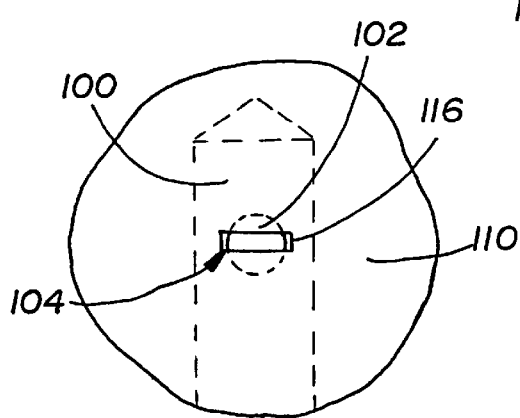
FIG. 6A is a cross-sectional view taken along line 6A—6A of FIG. 3 showing the passive damping element in the open position.

FIG. 3 illustrates control sleeve 110 biased in the normally open position via biasing springs 128 and 130. Arrow 132 indicates the rotational freedom of control sleeve 110 about piston rod 48. It can also be seen in FIG. 3 and the cross section shown in FIG. 6A, that when control sleeve 110 is biased in the normally open position, split 116 is aligned with transverse bypass bore 102. This arrangement allows the maximum amount of hydraulic fluid to communicate through passively controlled flow passage 104, which in turn provides minimal amounts of damping.

Figure 6B:
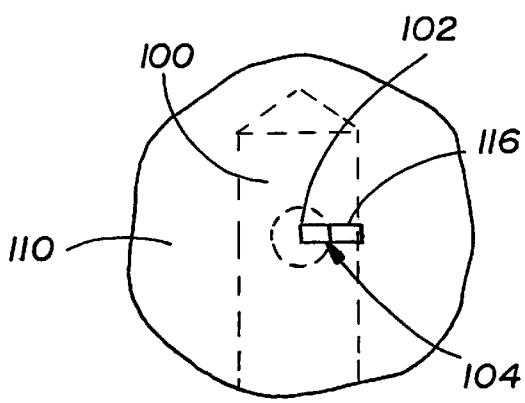
FIG. 6B is a cross-sectional view similar to that of FIG. 6A showing the passive damping element in the partially closed position due to the forces of a lateral acceleration.
Figure 6C:
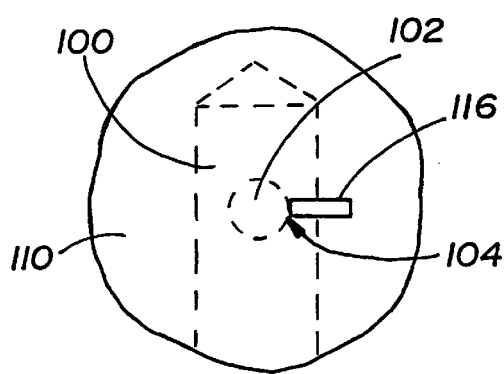
FIG. 6C is a cross-sectional view taken along line 6C—6C of FIG. 4 showing the passive damping element in the closed position due to the forces of a lateral acceleration.

With reference now to FIG. 4, control sleeve 110 is shown in the fully rotated position due to a lateral force. Arrow 38 indicates the direction of the lateral force on vehicle body 24, and thus on shock absorber 40. During a lateral force condition, the forces placed upon eccentric mass 114 cause control sleeve 110 to rotate about piston rod 48. As this occurs, split 116 moves out of its normal alignment with transverse bypass bore 102, which correspondingly reduces the size of the bi-directional flow passage 104, and further restricts the fluid communication between the upper and lower working chambers 64 and 66. As the size of the passively controlled flow passage 104 is reduced, the amount of damping force provided by passive damping system 108 is increased (FIG. 6B). A sufficiently strong force will cause the passively controlled flow passage 104 to be closed off completely thereby maximizing the amount of damping force provided by passive damping system 108 (FIG. 6C). It can therefore be appreciated that as the shock absorber 40 experiences a lateral acceleration, the passively controlled damping system 108 implemented by the eccentrically weighted control sleeve 110 provides variable rates of damping which are proportional to the amount of lateral force placed on mass 114. When the vehicle suspension 32, 26 is outfitted with four similar anti-roll shock absorbers 40 having passive damping system 108, the normal vertical force damping characteristic provided by each shock absorber is supplemented with a passively controlled anti-roll system which is sensitive to lateral or horizontal accelerating forces placed on the vehicle body.

In operation, a shock absorber 40 equipped with passive damping system 108 is installed and positioned within the front and rear suspension 32, 26 such that transverse bypass bore 102 is aligned parallel to the longitudinal or front-to-rear axis of the vehicle body 24. Such an alignment scheme allows control sleeve 110 and especially eccentric mass 114 to be especially sensitive to the rolling forces 36 and the lateral forces 38 placed upon the vehicle body 24.

During normal vehicle operating conditions, the damping provided by piston body 52 is responsive to vertical forces placed upon shock absorber 40. Also during normal operating conditions, the passively controlled flow passage 104 remains open and provides a constant level of fluid communication and thus damping in conjunction with piston body 52. However, during a lateral acceleration condition, the amount of damping force provided by passive damping system 108 is proportionally increased due to the passive control and operation of eccentrically weighted control sleeve 110. Accordingly, one skilled in the art will appreciate that such a simple passively controlled damping system provides a very low cost anti-roll system which can be readily incorporated into conventional shock absorbers.

Turning now to FIG. 7, a second preferred embodiment of the passive damping system according to the teachings of the present invention is illustrated. With particular reference to FIG. 7, a second exemplary hydraulic actuator or shock absorber 200 which includes a passively controlled damping system 220 is further defined by an elongated tubular pressure cylinder 202 for defining a hydraulic fluid containing working chamber 204. Disposed within working chamber 204 is a reciprocable piston assembly 206 that is secured to the lower end of an axially extending piston rod 208. Piston rod 208 is supported and guided for movement within pressure cylinder 202 by means of a combination seal and rod guide assembly 210 located in an upper end of pressure cylinder 202 and having a central axially extending bore 212 through which piston rod 208 is reciprocally moveable. Upon movement of piston rod 208 and piston assembly 206, hydraulic damping fluid within working chamber 204 will be transferred between an upper portion 214 and a lower portion 216 of working chamber 204 for damping the relative movement between the vehicle body 24 and the suspension 26, 32 of the automobile 22.

While piston assembly 206 is shown as a solid structure without any type of pressure operated valving arrangement, it should be understood that several different types of valving arrangements can be used in conjunction with the passive damping system 220 associated with the second embodiment of the present invention. Accordingly, for purposes of this disclosure, it should be understood that piston assembly 206 includes some type of conventional bypass valve arrangement which provides the primary damping force in response to vertical forces placed upon shock absorber 200. For example, pressure operated valving arrangement 50 described in conjunction with shock absorber 40, could be utilized as the pressure operated valving arrangement for producing distinct flow restrictions and, in turn, damping characteristics for the compression and rebound strokes associated with shock absorber 200.

With continued reference to FIGS. 7 through 10, the passive damping system 220 associated with the second embodiment of the present invention is described in more detail. The primary function of passive damping system 220 is to provide variable rates of damping force in response to lateral or horizontal forces placed upon the vehicle body 24. As with shock absorber 40, a vehicle suspension 32, 26 can be outfitted with four similar passive damping shock absorbers 200 having passive damping system 220 for implementing a passively controlled anti-roll system which is sensitive to lateral or horizontal accelerating forces. However, as will be appreciated by the following description of this second embodiment, the passive damping system 220 incorporated within shock absorber 200 is responsive to any lateral forces which are experienced around a 360° circumference with respect to piston rod 208. As such, passive damping system 220 is responsive to the lateral forces produced by a rolling condition, as well as horizontal forces placed upon the vehicle body 24 during extreme acceleration and deceleration conditions such as those produced by braking.

Passive damping system 220 is further defined by a lower control disk 222 having a central bore 224 formed therein. The inside diameter of central bore 224 is sized just slightly larger than the outside diameter of piston rod 208 so that piston rod 208 and lower control disk 222 can move with respect to each other while preventing hydraulic fluid from passing between these components. The outside diameter of lower control disk 222 is sized just slightly smaller than the inside diameter of pressure cylinder 202, so that lower control disk 222 may also move reciprocally with respect to pressure cylinder 202 while preventing hydraulic fluid from passing between their engaging surfaces. Lower control disk 222 includes a plurality of apertures 226, forming an annular ring. It will be appreciated that the number of apertures 226, as well as the size of the apertures 226 can be altered for producing various flow rates, and accordingly adjusting the damping characteristic provided thereby. The lower portion of lower control disk 222 also includes one or more reinforcing ribs 228 which provide additional rigidity to lower control disk 222 and further prevents the fluid passage defined by apertures 226 from being blocked during instances when lower control disk 222 temporarily engages the top portion of piston assembly 206. An outer biasing spring 230 is secured to the top surface of lower control disk 222. The top portion of outer biasing spring 230 is also fixedly secured to a bottom surface of rod guide 210. As disclosed, outer biasing spring 230 is a helical coil spring having an outside diameter which is slightly undersized with respect to the inside diameter of the pressure cylinder 202.

Passive damping system 220 is further defined by an upper control disk 242, which under normal operating conditions, engages the top surface of lower control disk 222. Upper control disk 242 includes an oversized bore 244 formed in a central portion thereof. Oversized bore 244 is sized approximately 30–50% larger than the diameter of piston rod 208 so that the upper control disk 242 can move about a path defined by oversized bore 244 with respect to piston rod 208. The outside diameter of upper control disk 242 is smaller than the outside diameter of lower control disk 222, to allow upper control disk 242 to move with respect to lower control disk 222. A series of apertures 246 are formed around upper control disk 242, also forming an annular ring. As will be appreciated, the size and spacing of apertures 246 are preferably selected to be identical to apertures 226 of lower control disk 222 so that when the center of lower control disk 222 aligns with the center of upper control disk 242, apertures 226 will be directly aligned with apertures 246 for defining a series of bypass flow passages 248. An inner spring 250 having a diameter smaller than that of outer spring 230 is fixedly secured to the top surface of upper control disk 242. The opposite end of inner spring 250 is secured to the corresponding top portion of outer spring 230. Thus, the top portions of outer spring 230 and inner spring 250 are fixedly secured to rod guide 210. During the absence of a lateral or horizontal force, the lower and upper control disks 222, 242 are positioned to align the series of apertures 226, 246 so as to maximize the size of the bypass flow passages 248.

Referring now to FIG. 8, the alignment of lower control disk 222 and upper control disk 242 with respect to pressure cylinder 202 and piston rod 208 is illustrated. Additionally, the alignment of apertures 226 with apertures 246 for defining bypass flow passage 248 can be seen in this top sectional view. Also depicted in FIG. 8 is a series of annular offset apertures 252 drawn with phantom lines. Offset apertures 252 represent the position of apertures 246 formed in upper control disk 242 as the result of a lateral or horizontal force defined in the direction of arrow 254 which would cause upper control disk 242 to become misaligned with the lower control disk 222. This misalignment caused by the lateral or horizontal force will correspondingly reduce the total size of the flow passages 248 which thereby reduces the amount of fluid communication between the upper chamber 232 and lower chamber 234. Thus, the amount of damping provided to the passive anti-roll system can be passively controlled by passive damping system 220.

As will be appreciated, the length and spring constants of outer spring 230 and inner spring 250 must be selected such that outer spring 230 will oppose inner spring 250 so that the upper control disk 242 is biased for engaging lower control disk 222. Moreover, inner spring 250 should be selected so that the inertia of upper control disk 242 can force the upper control disk 242 to move with respect to lower control disk 222 during lateral acceleration conditions. The outer and inner springs 230, 250 also allow the upper and lower control disks 222, 242 to travel upwardly and downwardly about piston rod 208 within pressure cylinder 202. Another purpose of outer and inner springs 230, 250 is to prevent the upper control disk 242 and lower control disk 222 from rotating with respect to each other. Accordingly, under the various operating conditions, any misalignment between apertures 226 and apertures 246 should be the result of a lateral or horizontal force sliding upper control disk 242 out of its normal position, rather than the control disks 222, 242 rotating with respect to each other. Inner spring 250 is also designed to return upper control disk 242 to its normal operating position in the absence of lateral or horizontal forces.

FIG. 9 illustrates the optimal alignment of lower control disk 222 with upper control disk 242 and thus alignment of apertures 226 and apertures 246, which provides the maximum sized bypass flow passage 248 through which hydraulic damping fluid may pass. FIG. 10 illustrates the misalignment of apertures 226 with apertures 246 as upper control disk 242 slides sideways with respect to lower control disk 222 during a lateral or horizontal force condition which correspondingly restricts the size of the bypass flow passage 248. The amount of sideways movement of upper control disk 242 with respect to lower control disk 222 is typically proportional to the force produced by the lateral or horizontal acceleration upon upper control disk 242. FIG. 10 further illustrates upper control disk 242 in its maximum sideways position, thereby causing bypass flow passages 248 to be completely closed off. As such, the communication of hydraulic fluid between upper chamber 232 and lower chamber 234 is restricted, thereby increasing the damping force provided by shock absorber 200 during the lateral or horizontal acceleration condition. Accordingly, one skilled in the art will appreciate that a passively controlled damping system 220 can be efficiently and readily incorporated into the damping mechanism associated with conventional shock absorbers for creating a passive anti-roll suspension system.

With reference now to FIGS. 11 and 12, a third preferred embodiment of the passive damping system according to the present invention is shown. More particularly, FIG. 11 illustrates a third exemplary hydraulic actuator or shock absorber 300 which includes a passively controlled damping system 336. Shock absorber 300 is further defined by an elongated tubular pressure cylinder 301 for defining a conventional working chamber 302 containing hydraulic fluid. Disposed within working chamber 302 is a reciprocable piston assembly 303 that is secured to the lower end of an axially extending piston rod 308. An annular sealing ring 304 is secured to the top of pressure cylinder 301 and includes an outer O-ring 305 for sealing against surface 311, and an inner O-ring 306 for sealing against piston rod 308. The assembly 307 of cylinder 301 and annular sealing ring 304 moves up and down within chamber 312 and against surface 311 defined by to outer reserve chamber assembly 316. Piston assembly 303 and piston rod 308 are fixed with respect to top sealing plate 314, and thus, assembly 307 moves with respect to piston assembly 303. Additionally, piston assembly 303 defines the upper portion 309 and lower portion 310 of the working chamber 302.

As shown, working chamber 302 is surrounded by outer reserve chamber assembly 316, which defines a fluid reservoir 318 for storing the hydraulic fluid displaced by the "volume" of the assembly 307 of cylinder 301 and annular sealing ring 304. Hydraulic damping fluid communicates between upper chamber 312 and fluid reservoir 318 via a pair of apertures 342, 344 formed in the top portion of the shock absorber 300. A down tube 319 is fixed about the periphery of aperture 344 and extends down into fluid reservoir 318 for preventing air or gas residing within the upper portion of fluid reservoir 318 from being transferred into chamber 312.

Shock absorber 300 is also provided with a separate pressure cylinder 320 which operates as a supplemental compression or spring apparatus. Pressure cylinder 320 has a piston 326 disposed therein for creating a compressed gas chamber 322 and a hydraulic fluid chamber 324. Chamber 322 is preferably filled with a compressed gas such as nitrogen for exerting force upon the top surface of piston 326. A corresponding force or pressure is placed upon the damping fluid contained in fluid chamber 324 which is transferred through a fluid line 328 connected to a fitting 330 and into chamber 312. The force from piston 326 is thus transferred to the top surface of annular sealing ring 304 for creating an additional gas spring. Upon movement of the assembly 307 within chamber 312, hydraulic damping fluid communicates between upper portion 309 and lower portion 310 of chamber 304 via the bypass valve arrangement associated with piston assembly 303 for damping the relative movement between the vehicle body 24 and the suspension 26, 32 of automobile 22. Fluid is also transferred between chamber 312 and chamber 318.

While piston assembly 303 is also shown as a structure without any specific type of fluid bypass valving arrangement, it should be understood that several different types of fluid bypass valving arrangements can be used in conjunction with the passive damping system 336 associated with the third embodiment of the present invention. Accordingly, for purposes of this disclosure, it should be understood that piston assembly 303 includes some type of conventional fluid bypass valve arrangement which provides one of several damping forces in response to vertical forces placed upon shock absorber 300. This conventional fluid bypass valve arrangement is the primary damping mechanism for shock absorber 300, and operates both during normal driving conditions and cornering or "rolling" driving conditions. For example, pressure operated valving arrangement 50 described in conjunction with shock absorber 40, could be utilized as the pressure operated valving arrangement for producing distinct flow restrictions and, in turn, damping characteristics for the compression and rebound strokes associated with shock absorber 300.

With continued reference to FIGS. 11 and 12, the passive damping system 336 associated with the third embodiment of the present invention is described in more detail. The primary function of passive damping system 336 is to provide variable rates of damping force in response to lateral forces placed upon the vehicle body 24 which are typically encountered during cornering maneuvers. As with shock absorber 40, a vehicle suspension 32, 26 can be outfitted with four similar passive damping shock absorbers 300 incorporating a passive damping system 336, for implementing a passively controlled anti-roll system which is sensitive to lateral accelerating forces. However, as will be appreciated by the following description of this third embodiment, the passive damping system 336 incorporated within shock absorber 300 is responsive to lateral forces occurring in either a longitudinal direction or a transverse direction, depending upon the orientation of passive damping system 336. As such, the preferred implementation for passive damping system 336 is to provide additional anti-roll damping to counteract lateral or rolling forces placed upon the vehicle body 24 during cornering maneuvers.

Passive damping system 336 is further defined by a lower support plate 340 having a central bore (not shown) formed therein, through which piston rod 308 extends. Lower support plate 340 includes an inboard aperture 342 which is positioned above chamber 312, and an outboard aperture 344 which is positioned over fluid reservoir 318. A control plate 346 having a bore 348 formed therein is journally supported by piston rod 308. As such, control plate 346 is able to rotate about piston rod 308 in response to the inertial forces placed thereon. Control plate 346 also includes an eccentric mass 350 concentrated at the outboard end thereof. A biasing spring 354 is secured between a first spring post 352 formed near the outboard end of control plate 346, and a second spring post 356 formed on a top portion of lower support plate 340.

Under normal operating conditions, biasing spring 354 maintains control plate 346 in the open position so that the size of inboard aperture 342 is maximized, and hydraulic damping fluid can more easily flow between chamber 312 and fluid reservoir 318 via inboard aperture 342 and outboard aperture 344. However, during a lateral acceleration condition, such as that indicated by phantom direction arrow 358, the force or inertia placed upon eccentric mass 350 causes control plate 346 to rotate about piston rod 308 into a position illustrated by exemplary phantom line control plate 360 for partially or fully covering the inboard aperture 342 for reducing the size of inboard aperture 342 and restricting the movement of fluid between chamber 312 and fluid reservoir 318. As control plate 346 rotates into a position which begins to cover and restrict inboard aperture 342, passive damping system 336 produces an increased level of damping which is proportional to the lateral force, such as that force indicated by arrow 358. This results in restricting the movement of cylinder 301 with respect to piston assembly 303 and reserve chamber assembly 316 during the lateral acceleration condition. In the absence of a lateral force, or as the lateral force appropriately decreases, biasing spring 354 returns the control plate 346 to the normal operating position and maximizes the size of inboard aperture 342. Once inboard aperture 342 is maximized, the remaining damping forces are primarily provided by piston assembly 303. Accordingly, one skilled in the art will appreciate that the passively controlled damping system 336 can be efficiently and readily incorporated into the damping mechanism associated with conventional shock absorbers for creating a passive anti-roll system.

The foregoing discussion discloses and describes various exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A passive damping system for a shock absorber comprising:

a working chamber;

a piston disposed in the working chamber;

a piston rod connected to the piston and extending through a top portion of the working chamber;

a variable bypass assembly disposed in the working chamber between a first fluid working chamber and a second fluid working chamber, the variable bypass assembly including a lower control disk having a plurality of apertures, and an upper control disk having a plurality of apertures, the apertures forming a series of alignable bypass apertures for providing fluid communication between the first and second fluid working chamber, the upper and lower control disks being moveable with respect to each other for varying the size of the bypass apertures; and biasing means for normally retaining the upper control disk in alignment with the lower control disk for maximizing the size of the bypass apertures;

whereby a horizontal accelerating force placed upon the shock absorber causes motion of the upper control disk for restricting the size of the bypass apertures and increasing a damping force provided by the shock absorber.

2. The passive damping system of claim 1 wherein the biasing means comprises a first spring secured to a top surface of the lower control disk, and a second spring secured to a top surface of the upper control disk.

3. The passive damping system of claim 2 wherein a top portion of the first spring is secured to a top portion of the second spring.

4. The passive damping system of claim 2 wherein the first spring and the second spring are helical coil springs.

5. The passive damping system of claim 2 wherein a circumference of the second spring is smaller than a circumference of the first spring, such that the second spring can be disposed inside of the first spring.

6. The passive damping system of claim 1 wherein the lower control disk is prevented from rotating with respect to the upper control disk.

7. The passive damping system of claim 1 wherein the upper control disk operates as a passive damping control mechanism.

* * * * *